United States Patent
Hendry et al.

(10) Patent No.: US 10,475,170 B2
(45) Date of Patent: Nov. 12, 2019

(54) RENDERING INFORMATION INTO IMAGES

(71) Applicant: Apple Inc., Cupertino, CA (US)

(72) Inventors: Ian C. Hendry, San Jose, CA (US); John C. Gnaegy, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/017,423

(22) Filed: Jun. 25, 2018

(65) Prior Publication Data

US 2018/0308224 A1 Oct. 25, 2018

Related U.S. Application Data

(63) Continuation of application No. 15/620,514, filed on Jun. 12, 2017, now Pat. No. 10,032,263.

(60) Provisional application No. 62/349,001, filed on Jun. 12, 2016.

(51) Int. Cl.
| | |
|---|---|
| *G06T 5/00* | (2006.01) |
| *G06T 7/90* | (2017.01) |
| *G06T 11/00* | (2006.01) |
| *G06T 11/60* | (2006.01) |
| *H04N 5/57* | (2006.01) |
| *G06T 7/11* | (2017.01) |

(52) U.S. Cl.
CPC ............... *G06T 5/009* (2013.01); *G06T 7/11* (2017.01); *G06T 7/90* (2017.01); *G06T 11/001* (2013.01); *G06T 11/60* (2013.01); *G06T 2207/10016* (2013.01)

(58) Field of Classification Search
CPC combination set(s) only.
See application file for complete search history.

(56) References Cited

U.S. PATENT DOCUMENTS

| | | | |
|---|---|---|---|
| 7,983,502 B2 | 7/2011 | Cohen | |
| 8,111,941 B2 | 2/2012 | Kokemohr | |
| 8,144,255 B2* | 3/2012 | Hirayama | ............ G06K 9/3266 |
| | | | 348/468 |
| 8,243,797 B2 | 8/2012 | Lin | |
| 8,559,709 B1 | 10/2013 | Hobbs | |
| 2003/0095135 A1 | 5/2003 | Kaasila | |
| 2007/0222895 A1* | 9/2007 | Yamauchi | .............. H04N 5/445 |
| | | | 348/701 |

(Continued)

FOREIGN PATENT DOCUMENTS

KR 101273328 B1 * 6/2013 ............... H04N 7/08

*Primary Examiner* — Wesner Sajous
(74) *Attorney, Agent, or Firm* — Blank Rome LLP

(57) ABSTRACT

Systems, methods, and computer readable media to improve the operation of a display system are disclosed. Techniques disclosed herein selectively darken a region of an image so that when text or other information is rendered into that region, the contrast between the text or other information and the underlying image in that area is sufficient to ensure the text or other information is visible and readable. In one embodiment, a region into which information is to be rendered may be combined or blended with tone mapped values of those same pixels in accordance with a given function, where the function gives more weight to the tone mapped pixel values the closer those pixels are to the midline of the region and more weight to untone-mapped image pixel values the further those pixels are from the midline of the region.

20 Claims, 7 Drawing Sheets

(56) References Cited

U.S. PATENT DOCUMENTS

| | | | |
|---|---|---|---|
| 2010/0328529 A1* | 12/2010 | Hirayama | G06K 9/3266 |
| | | | 348/452 |
| 2012/0081566 A1 | 4/2012 | Cote | |
| 2013/0239057 A1* | 9/2013 | Ubillos | G06F 3/04855 |
| | | | 715/833 |
| 2014/0210847 A1* | 7/2014 | Knibbeler | G09G 5/006 |
| | | | 345/589 |
| 2016/0258584 A1* | 9/2016 | Li | F21V 33/0088 |
| 2016/0335779 A1 | 11/2016 | Satish | |

* cited by examiner

RENDERING INFORMATION INTO IMAGES

BACKGROUND

This disclosure relates generally to the field of video processing and more particularly but not by way of limitation, to a system and method for rendering subtitles and other information into a high dynamic range (HDR) image or video sequence.

Images comprise one or more color components (e.g., luma Y and chroma Cb and Cr) and have a dynamic range. Dynamic range relates to the capability to represent a range of intensity or luminance values in an image, e.g., from darkest-darks (blacks) to brightest-brights (whites). Dynamic range also relates to the ability of a display device to adequately or approximately render an intensity range of a particular breadth. A typical cathode-ray tube (CRT), liquid crystal display (LCD), or plasma screen may be constrained in its dynamic range rendering capability which is inadequate to reproduce the full range of luminance values present in natural scenes. Luminance values in natural scenes typically range from 1 billion candela-per-square-meter ($cd/m^2$) for the sun, to 10000 $cd/m^2$ for lamps, and thousands of $cd/m^2$ for objects in sunlight (like a building or cloud rims). In contrast, a typical display screen can have a displayable luminance range from 0-500 $cd/m^2$. A video taken of outdoor scenes may have true world brightness values in the thousands of $cd/m^2$. When such scenes are rendered, the luminance range of the scene is mapped to the luminance range of the display. This is most often performed using a tone mapping function that maps an image's native luminance values to the luminance range of a given display so that scene elements—when rendered to the display—have approximately similar appearance differences as they do in the originally captured image. In this way tone mapping functions can, for example, convert HDR images to standard dynamic range (SDR) images for rendering on a display. Tone mapping addresses the problem of strong contrast reduction from the captured scene's radiance to the display's displayable range while preserving an image's details and color appearance important to appreciate the original scene content.

In general, a user can determine whether to view subtitles in a video image by making a selection on the user's display device. Subtitles are typically displayed as white text over an underlying region of the image. The subtitle may be added by substantially darkening or blackening the underlying region of the image to provide contrast with the white overlay text. One approach to create the underlying region is to greatly darken the luminance or intensity of the pixels forming the region. In a SDR movie, the pixels of a scene have a normalized luminance range from 0 to 1, where 0 represents black and 1 represents white. The pixels constituting the underlying region are evenly compressed or darkened by 50% relative to their original intensity. This darkening provides a 50% contrast with the white overlay text that is added. This approach may deliver a satisfactory result when applied to SDR images, but does not work well with HDR images. In an HDR image, selecting an arbitrary luminance value to create a darkened underlying region can result in a region having the same luminance as the white overlay text. Unlike SDR images or videos, pixel luminance values in HDR images or video can have a (normalized) range from 0 to 2. In an HDR video, an image's scene can be as bright as the underlying textual plate or it can be brighter than the overlay text. For example, a scene that includes a white field can have a luminance of 2 and may be part of the underlying region. By dimming the underlying region by 50%, the brightness of the textual plate can be about the same brightness as the white overlay text (e.g., 1). As a consequence, the overlay text may not be visible. While the luminance of the text may be increased to provide contrast with the underlying plate, doing so may cause the text to be displayed as "eye-poppingly" bright, which is not a normal (or "user friendly") way to display a subtitle.

SUMMARY

The following summary is included in order to provide a basic understanding of some aspects and features of the claimed subject matter. This summary is not an extensive overview and as such it is not intended to particularly identify key or critical elements of the claimed subject matter or to delineate the scope of the claimed subject matter. The sole purpose of this summary is to present some concepts of the claimed subject matter in a simplified form as a prelude to the more detailed description that is presented below.

In one embodiment the disclosed concepts provide a method to display information in a designated region of an image (e.g., a high dynamic range, or HDR, image). The method includes obtaining an image having pixels, where each pixel has a value (e.g., one image from a video sequence of HDR images); identifying a region in the image, the region having a centerline and outer edges; Identifying a function that varies from an initial value at the region's centerline to a final value at an outer edge of the region (e.g., a smoothly linear or non-linear function); determining the pixel's image value (e.g., the value of the pixel in the image before operations in accordance with this method); determining a location of the pixel within the region (e.g., along the region's centerline, along an outer edge, or somewhere in-between); determining a first value for the pixel based on the function and the pixel's location; determining a tone map value for the pixel based on a tone map function and the pixel's image value; determining a region value for the pixel based on the pixel's image value, the pixel's tone map value and the pixel's first value (e.g., a weighted average of the pixel's image value and the pixel's tone map value); updating each pixel of the image in the region with the pixel's region value; and rendering, after updating, information into the region. In one or more other embodiments, the various methods described herein may be embodied in computer executable program code and stored in a non-transitory storage device. In yet other embodiments, the method may be implemented in an electronic device having image display capabilities.

DETAILED DESCRIPTION

Figure 1:
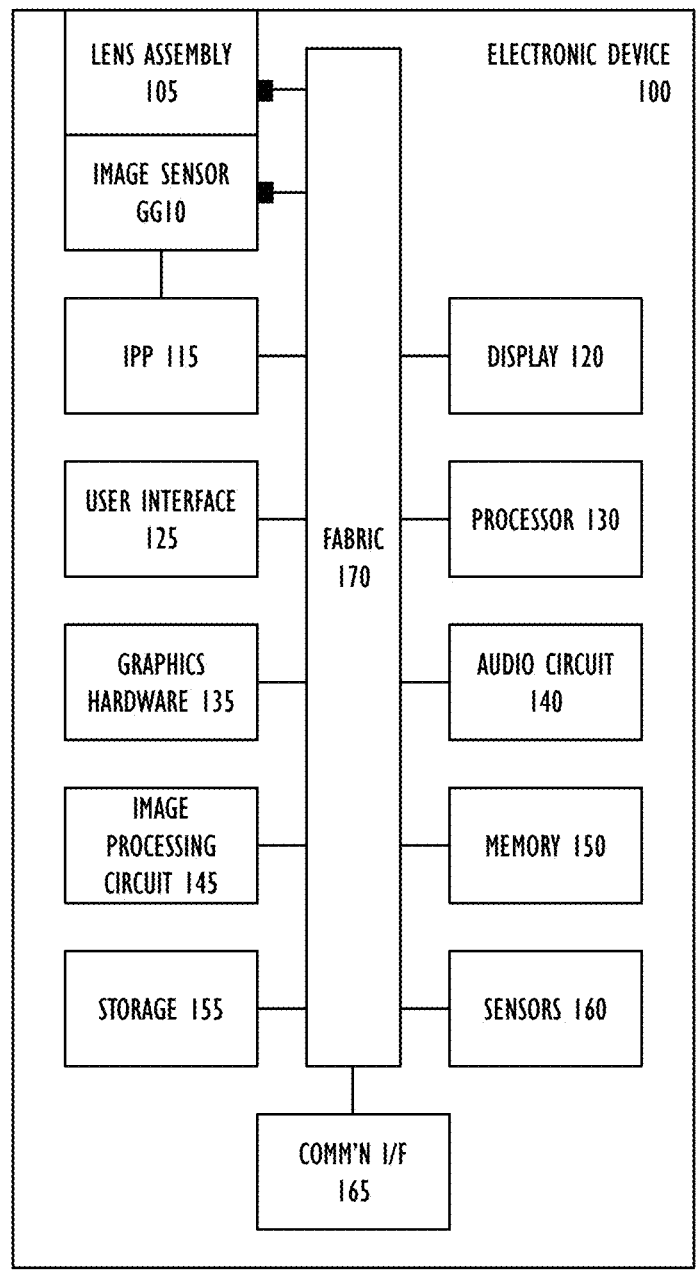
FIG. 1 shows, in block diagram form, a simplified functional block diagram of an illustrative electronic device in accordance with one or more embodiments.

This disclosure pertains to systems, methods, and computer readable media to improve the operation of a display system. In general, techniques are disclosed for rendering text and other information into images of a video sequence. More particularly, techniques disclosed herein selectively darken a region of an image so that when text or other information is rendered into that region, the contrast between the text or other information and the underlying image in that area is sufficient to ensure the text or other information is visible and readable. In one embodiment, a region into which information is to be rendered may be combined or blended with tone mapped values of those same pixels in accordance with a given function, where the function gives more weight to the tone mapped pixel values the closer those pixels are to the midline of the region and, conversely, more weight to untone-mapped image pixel values the further those pixels are from the midline of the region.

The techniques disclosed herein are applicable to any number of electronic devices with displays such as digital cameras, digital video cameras, mobile phones, personal data assistants (PDAs), portable entertainment players, and, of course, desktop, laptop, and tablet computer systems. In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

Embodiments of the information display system set forth herein can assist with improving the functionality of computing devices or systems that display images or image sequences (e.g., video). Computer functionality can be improved by enabling such computing devices or systems to display information in substantially any area of an image while ensuring contrast between the information and the underlying image is such that the information remains visible. Using display techniques in accordance with this disclosure can improve the "watchability" of wide gamut images displayed on wide gamut devices by ensuring that the displayed information remains visible and readable even when rendered in an especially bright region of the image.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics processing and display systems having the benefit of this disclosure.

Referring to FIG. 1, a simplified functional block diagram of illustrative electronic device 100 capable of rendering text and other information onto an image or video sequence is shown according to one or more embodiments. Electronic device 100 could be, for example, a mobile telephone, personal media device, a notebook computer system, a tablet computer system, or a desktop computer system. As shown, electronic device 100 may include lens assembly 105 and image sensor 110 for capturing images of a scene such as an HDR video. In addition, electronic device 100 may include image processing pipeline (IPP) 115, display element 120, user interface 125, processor(s) 130, graphics hardware 135, audio circuit 140, image processing circuit 145, memory 150, storage 155, sensors 160, communication interface 165, and communication network or fabric 170.

Lens assembly 105 may include a single lens or multiple lens, filters, and a physical housing unit (e.g., a barrel). One function of lens assembly 105 is to focus light from a scene onto image sensor 110. Image sensor 110 may, for example, be a CCD (charge-coupled device) or CMOS (complementary metal-oxide semiconductor) imager. Device 100 may include more than one lens assembly and more than one image sensor. Each lens assembly may focus light onto a single image sensor (at the same or different times) or different portions of a single image sensor. IPP 115 may process image sensor output (e.g., RAW image data from sensor 110) to yield a HDR image, image sequence or video sequence. More specifically, IPP 115 may perform a number of different tasks including, but not be limited to, black level removal, de-noising, lens shading correction, white balance adjustment, demosaic operations, and the application of local or global tone curves or maps. IPP 115 may comprise a custom designed integrated circuit, a programmable gate-array, a central processing unit (CPU), a graphical processing unit (GPU), memory or a combination of these elements (including more than one of any given element). Some functions provided by IPP 115 may be implemented at least in part via software (including firmware). Display element 120 may be a wide gamut display and may be used to display text and graphic output as well as receiving user input via user interface 125. For example, display element 120 may be a touch-sensitive display screen. User interface 125 can also take a variety of other forms such as a button, keypad, dial, a click wheel, and keyboard. Processor 130 may be a system-on-chip (SOC) such as those found in mobile devices and include one or more dedicated CPUs and one or more GPUs. Processor 130 may be based on reduced instruction-set computer (RISC) or complex instruction-set computer (CISC) architectures or any other suitable architecture and each computing unit may include one or more processing cores. Graphics hardware 135 may be special purpose computational hardware for processing graphics and/or assisting processor 130 perform computational tasks. In one embodiment, graphics hardware 135 may include one or more programmable GPUs each of which may have one or more cores. Audio circuit 140 may include one or more microphones, one or more speakers and one or more audio codecs. Image processing circuit 145 may aid in the capture of still and video images from image sensor 110 and include at least one video codec. Image processing circuit 145 may work in concert with IPP 115, processor 130 and/or graphics hardware 135. Images, once captured, may be stored in memory 150 and/or storage 155. Memory 150 may include one or more different types of media used by IPP 115, processor 130, graphics hardware 135, audio circuit 140, and image processing circuitry 145 to perform device functions. For example, memory 150 may include memory cache, read-only memory (ROM), and/or random access memory (RAM). Storage 155 may store media (e.g., audio, image and video files), computer program instructions or software, preference information, device profile information, and any other suitable data. Storage 155 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Device sensors 160 may include, but need not be limited to, an optical activity sensor, an optical sensor array, an accelerometer, a sound sensor, a barometric sensor, a proximity sensor, an ambient light sensor, a vibration sensor, a gyroscopic sensor, a compass, a barometer, a magnetometer, a thermistor sensor, an electrostatic sensor, a temperature sensor, a heat sensor, a thermometer, a light sensor, a differential light sensor, an opacity sensor, a scattering light sensor, a diffractional sensor, a refraction sensor, a reflection sensor, a polarization sensor, a phase sensor, a florescence sensor, a phosphorescence sensor, a pixel array, a micro pixel array, a rotation sensor, a velocity sensor, an inclinometer, a pyranometer and a momentum sensor. Communication interface 165 may be used to connect device 100 to one or more networks. Illustrative networks include, but are not limited to, a local network such as a universal serial bus (USB) network, an organization's local area network, and a wide area network such as the Internet. Communication interface 165 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). Communication network or fabric 170 may be comprised of one or more continuous (as shown) or discontinuous communication links and be formed as a bus network, a communication network, or a fabric comprised of one or more switching devices (e.g., a cross-bar switch). In general, one or more of processor 130, graphics hardware 135 and image processing circuit 135 may be configured to render selected information (textual or graphic) in a designated or specified region within an image or frame.

Figure 2:
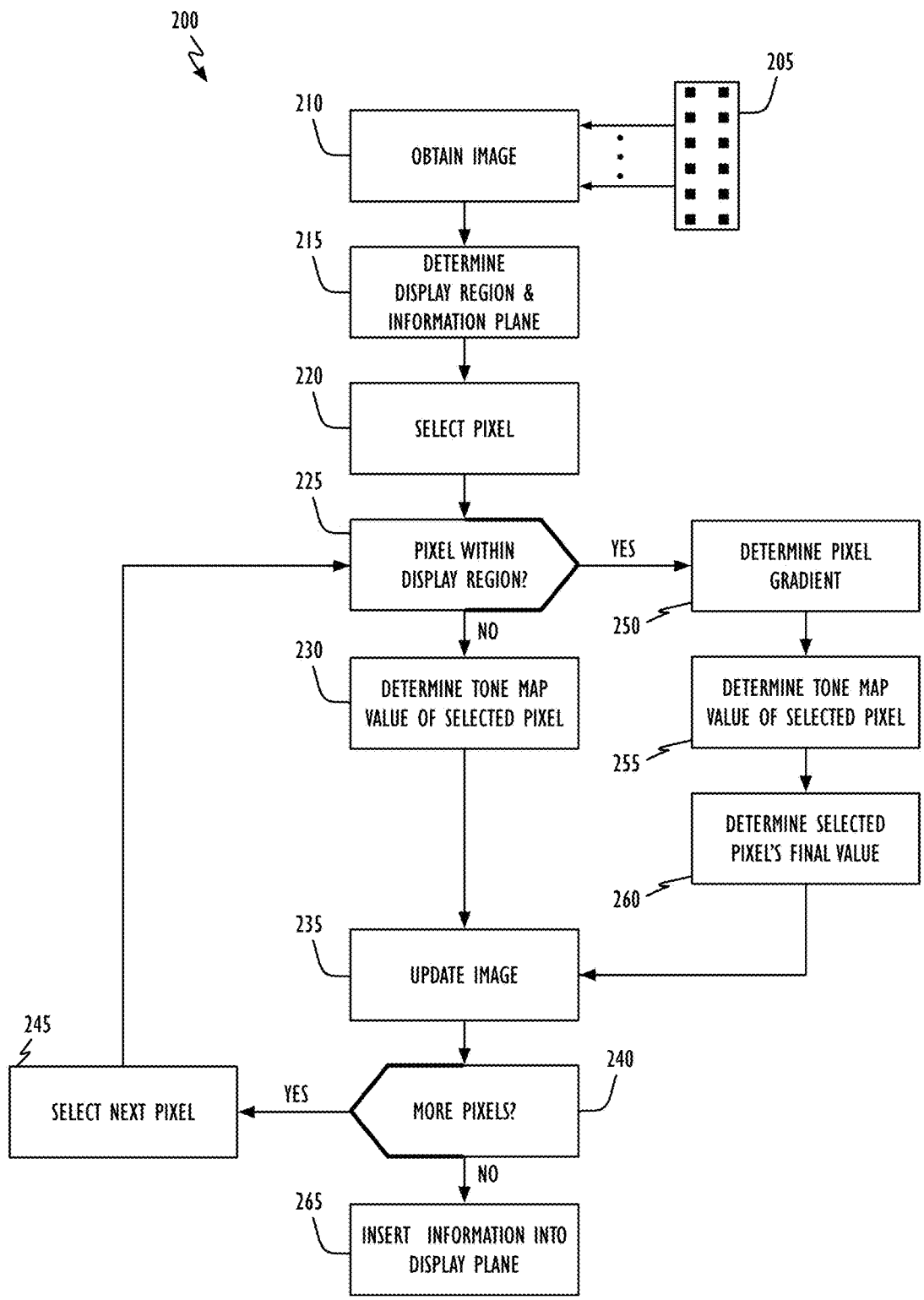
FIG. 2 shows, in flowchart form, an information overlay operation in accordance with one or more embodiments.

Referring to FIG. 2, information overlay operation 200 in accordance with one or more embodiments may begin when electronic device 100 obtains input video or image sequence 205 (block 210). For example, input video 205 may be captured by lens assembly 105 and image sensor 110 (collectively a "camera"). Alternatively, input video 205 may be received by electronic device 100 from an external system over a network via communication interface 165. Input video 205 may include HDR images in YCbCr format or RGB pixel data from which corresponding YCbCr pixel values may be determined. Once acquired, images or frames from video input 205 may be analyzed to determine a location for rendering the target overlay information (block 215).

Figure 3A:
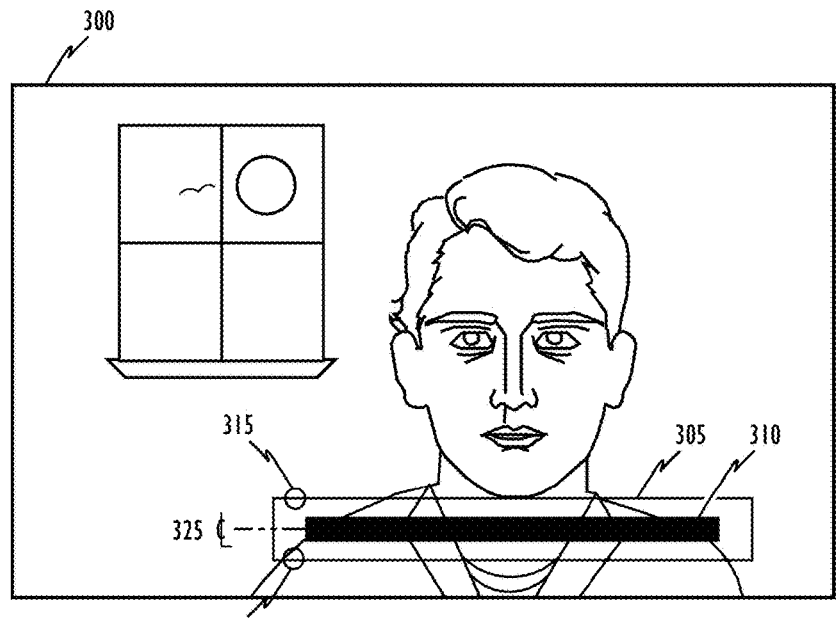
FIG. 3A illustrates various display regions within an image in accordance with one or more embodiments.

Referring to FIG. 3A, and by way of example, pixel coordinates for image frame 300 extracted from video input 205 may be retrieved and used to determine a location for underlying display region 305 within which the target overlay information may be inserted (e.g., onto overlay plane 310). Target overlay information may be text (e.g., subtitles), graphics or a combination of both and, while shown centered near the image's bottom, may be placed in any desired location or locations (e.g., the upper-right corner or along the left side). Underlying display region 305 may be a single rectangular region or multiple polygonal regions that are arranged to form region 305. The precise location and extent or size of display region 305 and, similarly, the extent or size of overlay plane 310 is a matter of design choice and may be subject to a number of constraints that would be known to one of ordinary skill in the art.

Returning to FIG. 2, a pixel in the image may then be selected (block 220). The selected pixel's location may be obtained and used to determine whether the pixel is within an area defined by display region 305. If the selected pixel's coordinate location is not inside display region 305 (the "NO" prong of block 225), the pixel's luminance value may be adjusted in accordance with a first tone mapping function (block 230) and, thereafter, the current image may be updated with the selected pixel's new value (block 235). In one embodiment, the first tone map may be selected to display the image properly on the target display element (e.g., an HD or other wide gamut display). The first tone map used in accordance with block 230 is a matter of design choice and may be any function deemed beneficial for the specific implementation. If pixels remain to be evaluated (the "YES" prong of block 240), a next—as yet unevaluated pixel—may be selected (block 245) where after information overlay operation 200 continues at block 225. If the selected pixel's coordinate location is within display region 305 (the "YES" prong of block 225), the selected pixel's gradient may be determined based on the pixel's location within the display region (block 250). In one or more embodiments, the gradient may be chosen to select how much of the underlying scene (i.e., within display region 305) is permitted to show through and interact with the "to be presented" information.

Figure 3B:
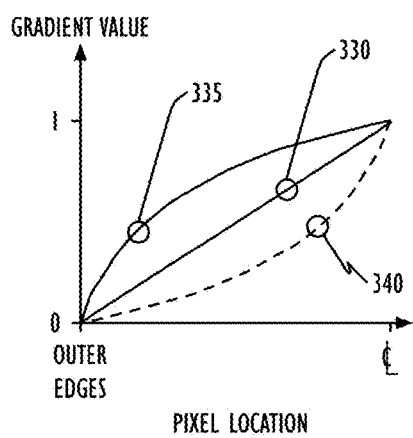
FIGS. 3B and 3C illustrate a gradient function in accordance with one or more embodiments.
Figure 3C:
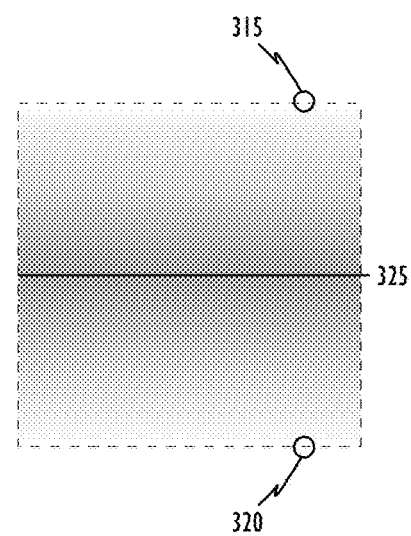

Referring to FIG. 3B, by way of example and not limitation, in one embodiment the gradient function may be chosen so that the underlying pixel's value from region 305 is not affected at the outer edges of region 305 (e.g., along edges 315 and 320) and maximally affected at region 305's centerline 325; where the overlay information is destined to be placed. In one particular embodiment, the gradient function may change linearly 330. In another embodiment, the gradient function may change smoothly but non-linearly as shown by curves 335 and 340. Referring to FIG. 3C, display region 305 has been shaded in accordance with function 335 to show pictorially how the gradient function may be made to change from one outer edge 315 to the other outer edge 320. In still another embodiment, the gradient function used from one outer edge of region 305 (e.g., outer edge 315) to centerline 325 may be different from the gradient function used from the other outer edge (e.g., outer edge 320) to centerline 325.

Figure 4:
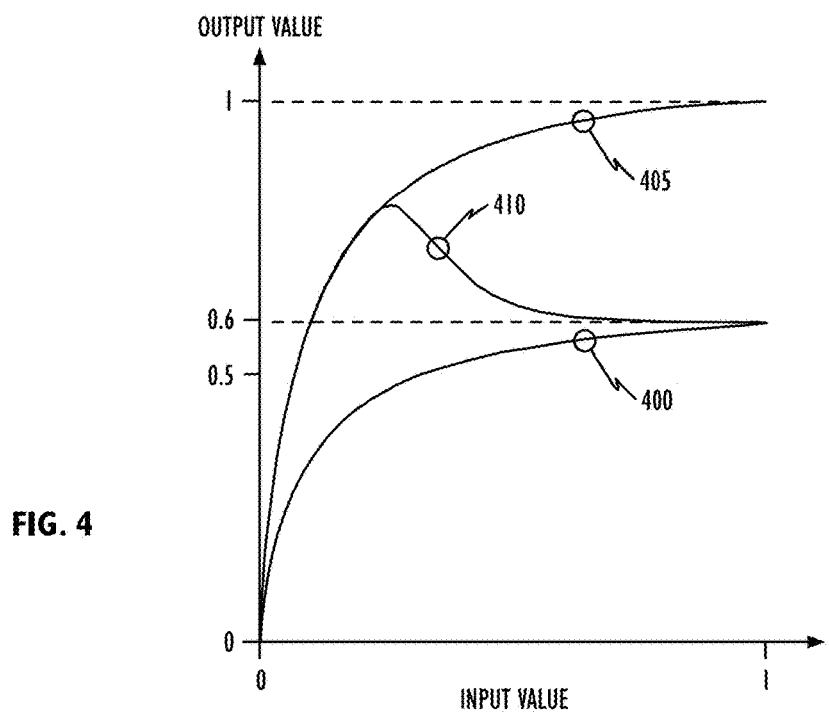
FIG. 4 illustrates different tone mapping functions in accordance with one or more embodiments.

Returning again to FIG. 2, once the selected pixel's gradient value has been determined the selected pixel may be tone mapped (block 255). A tone map in accordance with block 255 may be selected so as to provide an output that is clamped or limited to a value less than one. Referring to FIG. 4, in one embodiment modified tone map 400 may be used to soft-clamp its input to 0.6 (with respect to a normalized output range of 0 to 1). In other embodiments modified tone maps in accordance with this disclosure may be used to soft-clamp their input to any specified value less than one (with respect to a normalized output range of 0 to 1). "Standard" tone mapping functions (e.g., Reinhard function 405) are defined so as to asymptotically approach a maximum value of 1. When attempting to limit these functions to values less than one, they can behave oddly as shown by function 410; a result that does support an information overlay operation as disclosed herein.

Returning yet again to FIG. 2, the selected pixel's gradient and tone mapped values may be combined to yield a value (block 260) with which to update the currently selected image (block 235). If there are no more pixels in the selected image to process (the "NO" prong of block 240), the information to be displayed in the selected image may be inserted into overlay plane 310 of the updated image (block 265).

Figure 5:
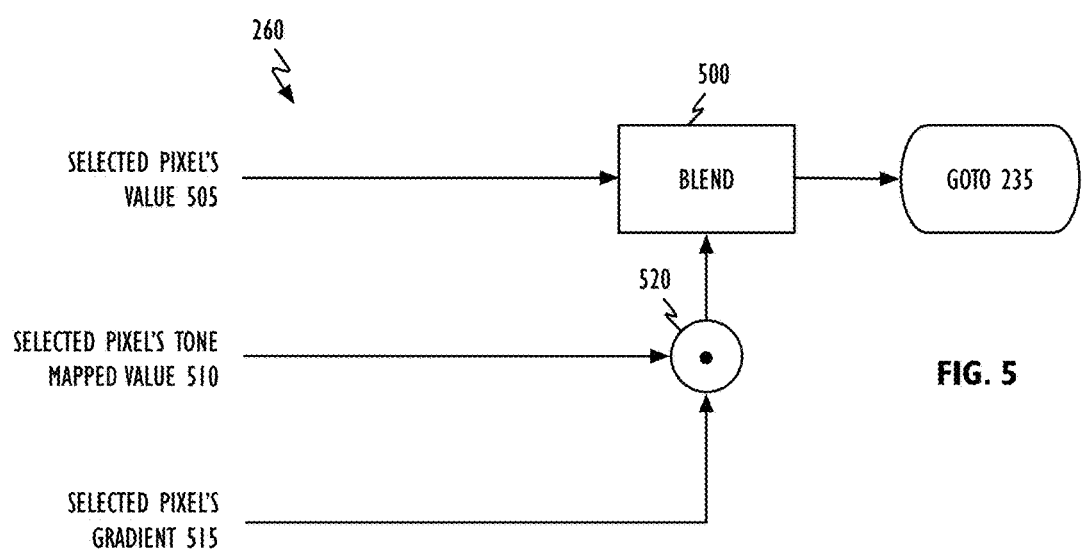
FIG. 5 shows, in block diagram form, a blend operation in accordance with one or more embodiments.

Referring to FIG. 5, operation 260 in accordance with one or more embodiments may combine or blend (in accordance with block 500) the selected pixel's value 505 (e.g., see block 220) and the selected pixel's tone map value 510 (e.g., see block 255) in accordance with the selected pixel's corresponding gradient value 515 (e.g., see block 250 and FIG. 3B). As discussed above with respect to the implementation illustrated in FIG. 3, when the selected pixel is at the outer edge of display region 305 (e.g., along edge 315 or 320), the selected pixel's gradient is zero (see FIG. 3B). The product (provided by element 520) of the selected pixel's tone mapped value 510 and this gradient value is therefore zero; meaning combine or blend operation 500 sends the selected pixel's value 505 to block 235. Alternatively, when the selected pixel is along centerline 325 of display region 305, the selected pixel's gradient is one (see FIG. 3B). The resulting product is then the selected pixel's tone mapped value 510; meaning blend operation 500 sends the blended value of the selected pixel's initial value 505 and its corresponding tone mapped value 510 to block 235.

Figure 6:
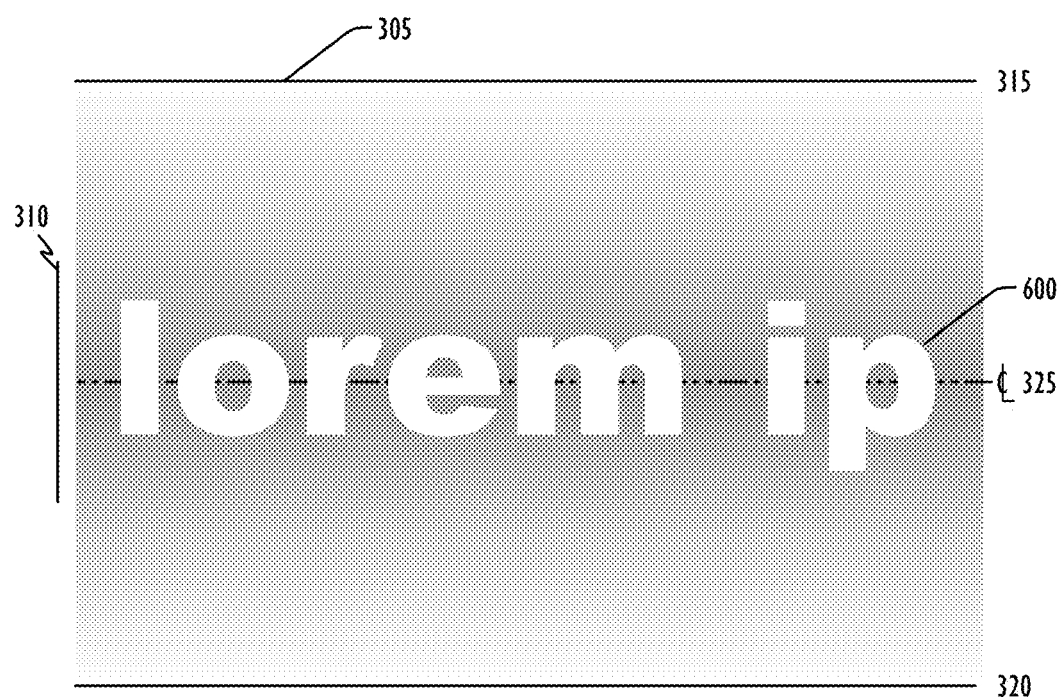
FIG. 6 illustrates information displayed in accordance with one or more embodiments.

Referring now to FIG. 6, once the selected image has been processed in accordance with operation 200 the image is ready to have target overlay information 600 rendered into overlay plane 310 within display region 305. Because the display region has been selectively darkened in accordance with FIG. 2, the contrast needed to render target information 600 is assured; even when the image is very bright in the area where the target information is to be displayed (i.e., region 305). In one embodiment, target information 600 may comprise subtitle information. In another embodiment, target information 600 may include graphics or symbols distinct from those used as subtitles.

Figure 7:
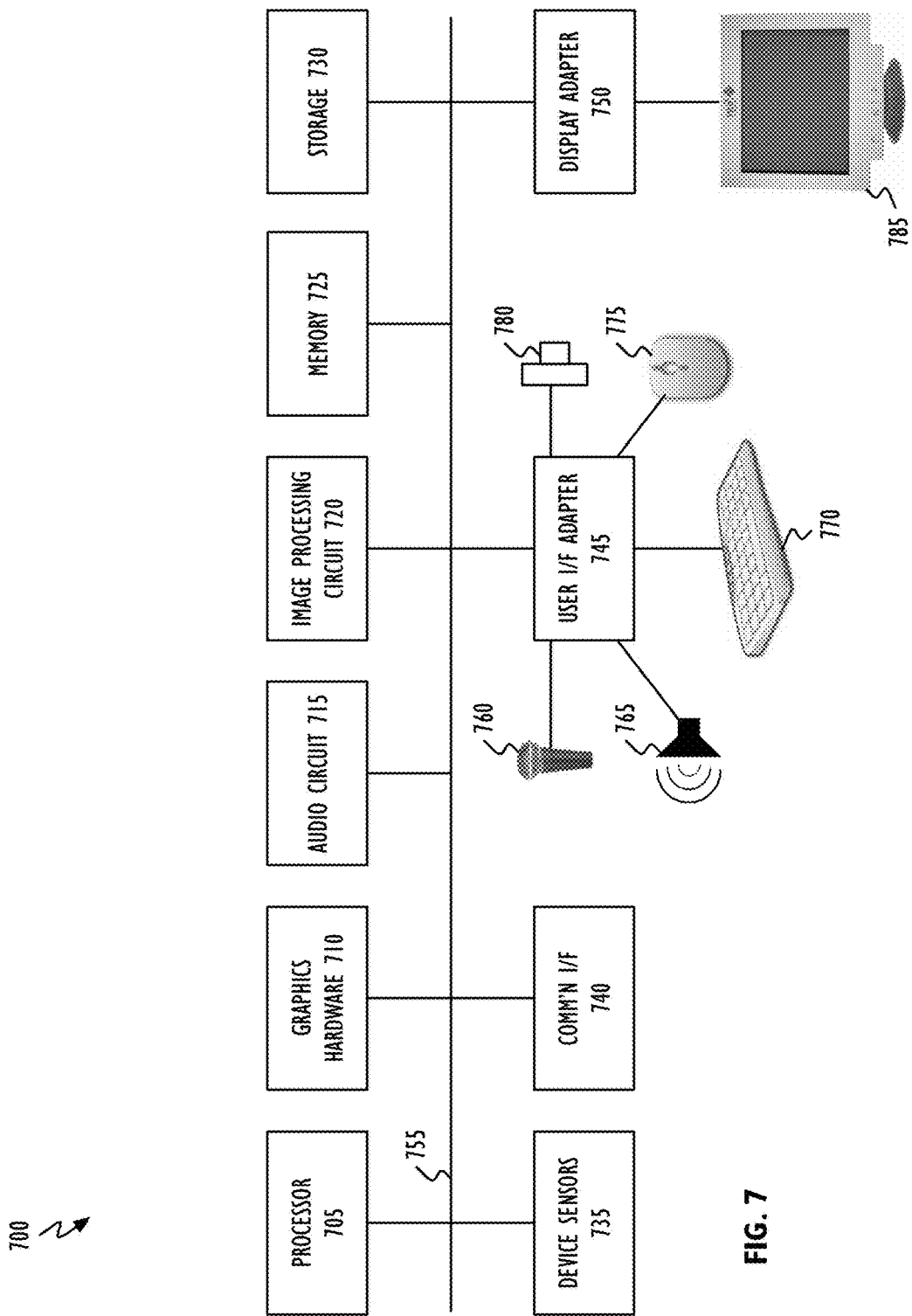
FIG. 7 shows, in block diagram form, a computer system in accordance with one or more embodiments.

Referring to FIG. 7, the information display operations in accordance with this disclosure may be performed by representative computer system 700 (e.g., a general purpose computer system such as a desktop or workstation computer system). Computer system 700 can be housed in single computing device or spatially distributed between two or more different locations. Computer system 700 may include processor 705, graphics hardware 710, audio circuits 715, image processing circuit 720, memory 725, storage 730, device sensors 735, communication interface 740, user interface adapter 745, and display adapter 750—all of which may be coupled via system bus, backplane or switching fabric 755. Processor 705, graphics hardware 710, audio circuit 715, image processing circuit 720, memory 725, storage 730, device sensors 735, communication interface 740, system bus or fabric 755, and display 785 may be of the same or similar type and serve the same function as the similarly named component described below with respect to FIG. 8. User interface adapter 745 may provide a means of coupling external devices such as microphone 760, speaker 765, keyboard 770, mouse or other pointing device 775, and image capture unit 780 to computer system 700. Display adapter 750 may be used to connect one or more display units (e.g., wide gamut display unit 785) which may also provide touch input capability.

Figure 8:
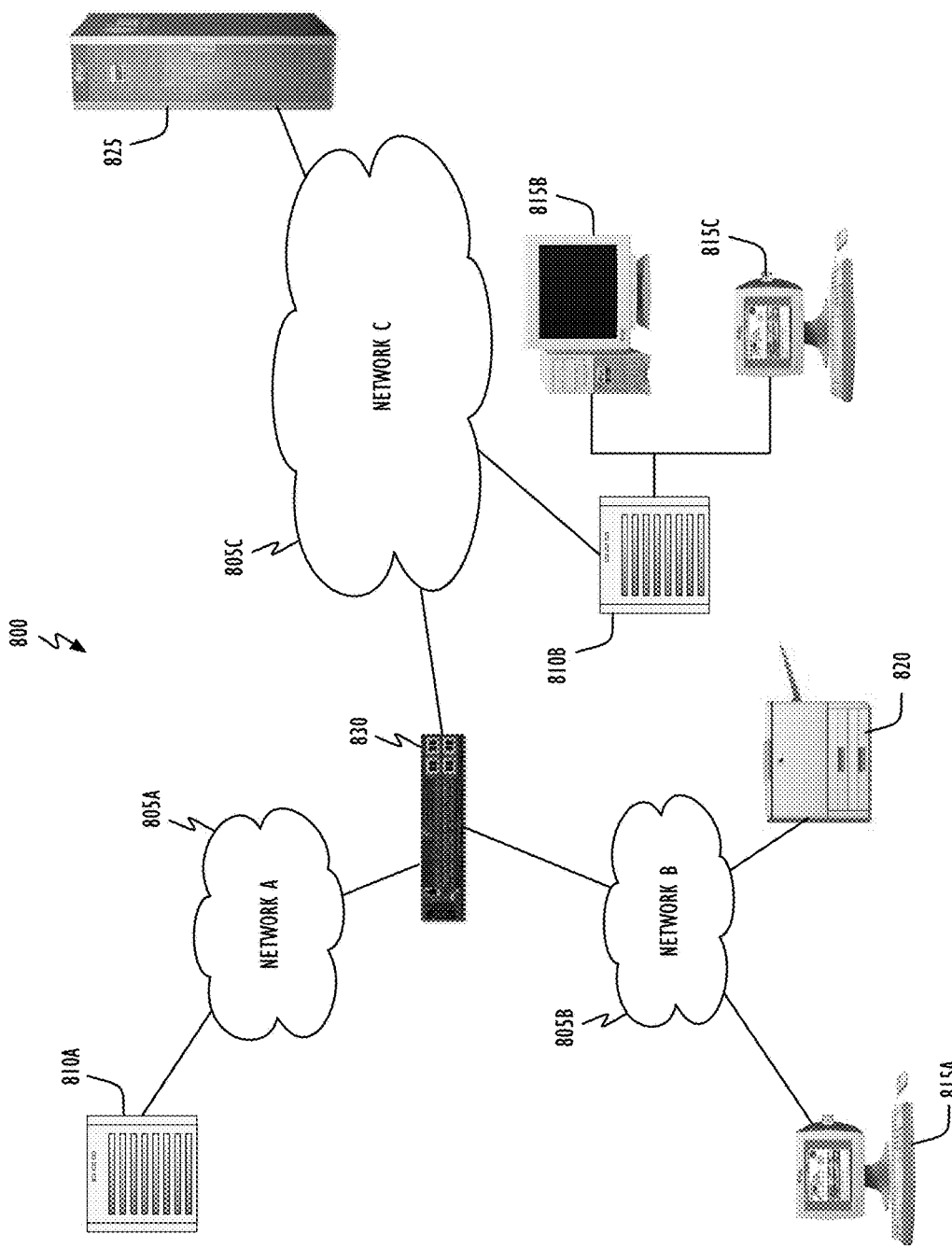
FIG. 8 shows, in block diagram form, a computer network in accordance with one or more embodiments.

Referring to FIG. 8, illustrative network architecture 800 within which an information display system in accordance with the disclosed techniques may be implemented includes a plurality of networks 805, (i.e., 805A, 805B and 805C), each of which may take any form including, but not limited to, a local area network (LAN) or a wide area network (WAN) such as the Internet. Further, networks 805 may use any desired technology (wired, wireless or a combination thereof) and communication protocol (e.g., TCP, or transmission control protocol and PPP, or point to point). Coupled to networks 805 are data server computer systems 810 (i.e., 810A and 810B) that are capable of communicating over networks 805. Also coupled to networks 805, and/or data server computer systems 810, are client or end-user computer systems 815 (i.e., 815A, 815B and 815C). Each of these elements or components may be a computer system as described above with respect to FIGS. 1 and 7. In some embodiments, network architecture 800 may also include network printers such as printer 820 and network storage systems such as 825. To facilitate communication between different network devices (e.g., server computer systems 810, client computer systems 815, network printer 820 and storage system 825), at least one gateway or router 830 may be optionally coupled there between.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device comprising instructions stored thereon to cause one or more processors to:

access an image in a memory, wherein the image includes a plurality of pixels that have a luminance range;

generate a subtitle region to be displayed at a location corresponding to a portion of the pixels of the image, wherein the subtitle region includes subtitle information with a luminance value;
reduce the luminance range for the portion of the pixels of the image to a target luminance range, wherein the luminance value of the subtitle information exceeds the target luminance range; and
cause display of the image with the subtitle region based on the target luminance range.

2. The non-transitory program storage device of claim 1, wherein the portion of the pixels comprises:
a first set of pixels associated with an inner line of the portion of the pixels, wherein the subtitle information overlays at least a portion of the inner line in the display of the image with the subtitle region; and
a second set of pixels associated with an outer edge of the portion of the pixels.

3. The non-transitory program storage device of claim 2, further comprising instructions to cause the one or more processors to implement a pixel gradient between the outer edge and the inner line, wherein the pixel gradient causes luminance values of the first set of pixels to be reduced more than luminance values of the second set of pixels.

4. The non-transitory program storage device of claim 2, wherein the inner line is a centerline.

5. The non-transitory program storage device of claim 1, wherein the luminance range associated with the pixels corresponds to a luminance range for a high dynamic range image.

6. The non-transitory program storage device of claim 1, wherein the subtitle region comprises an overlay region that includes pixels for displaying the subtitle information, and wherein the subtitle information includes texts, graphics, or both.

7. The non-transitory program storage device of claim 1, further comprising instructions to cause the one or more processors to:
perform a first tone mapping for a second portion of the pixels that are not associated with the subtitle region, wherein the first tone mapping maps colors for the image to colors of a target display device; and
perform a second tone mapping to reduce the luminance range for the pixels of the subtitle region to the target luminance range, wherein the first tone mapping and the second tone mapping differ.

8. The non-transitory program storage device of claim 1, wherein the luminance value of the subtitle information corresponds to the luminance value for white text.

9. A computer system comprising:
a memory; and
one or more processors coupled to the memory, wherein the one or more processors are configured to execute program instructions stored in the memory to cause the one or more processors to:
obtain an image that includes a plurality of pixels with a luminance range;
determine a subtitle region to be displayed at a first set of pixels that correspond to a portion of the image, wherein the subtitle region comprises subtitle information that has a luminance value;
perform tone mapping to reduce the luminance range for the first set of pixels to a target luminance range, wherein the luminance value of the subtitle information exceeds the target luminance range; and
render the subtitle region to be displayed on a display device based on the tone mapping.

10. The computer system of claim 9, wherein the luminance range associated with the pixels corresponds to a normalized luminance range from zero to two.

11. The computer system of claim 9, wherein the subtitle region further comprises:
a second set of pixels associated with an inner line of the first set of pixels, wherein the subtitle information overlays at least a portion of the inner line; and
a third set of pixels associated with an outer edge of the first set of pixels.

12. The computer system of claim 11, wherein the program instructions further cause the one or more processors to implement a pixel gradient operation between the outer edge and the inner line, and wherein a pixel gradient value for the first set of pixels generates is greater than a pixel gradient value for the second set of pixels.

13. The computer system of claim 12, the program instructions that cause the one or more processors to render the subtitle region further comprises program instructions that cause the one or more processor to render the subtitle region based on the tone mapping and the pixel gradient operation.

14. The computer system of claim 9, wherein the program instructions further cause the one or more processors to perform a second tone mapping for a second portion of the pixels that are not associated with the subtitle region, wherein the second tone mapping maps colors for the image to colors of the display device, and wherein the tone mapping differs from the second tone mapping.

15. The computer system of claim 9, wherein the luminance value of the subtitle information corresponds to a normalized luminance value of one.

16. A computer implemented method for generating subtitles in an image, comprising
accessing an image in a memory, wherein the image includes a plurality of pixels associated with a luminance range;
generating a subtitle region to be display at a first set of pixels that correspond to a portion of the image, wherein the subtitle region comprises subtitle information that has a luminance value;
reducing the luminance range for the first set of pixels to a target luminance range, wherein the luminance value of the subtitle information exceeds the target luminance range; and
rendering the subtitle region to be displayed on a display device based on the target luminance range.

17. The method of claim 16, further comprising:
performing a first tone mapping for a second set of the pixels that are not associated with the subtitle region, wherein the first tone mapping maps colors for the image to colors of a target display device; and
performing a second tone mapping to reduce the luminance range for the first set of pixels to the target luminance range, wherein the first tone mapping and the second tone mapping differ.

18. The method of claim 16, wherein the subtitle region further comprises:
a second set of pixels associated with an inner line of the first set of pixels, wherein the subtitle information overlays at least a portion of the inner line; and
a third set of pixels associated with an outer edge of the first set of pixels.

19. The method of claim 18, further comprising implementing a gradient function between outer edge and the inner line, wherein the gradient function causes luminance values of the first set of pixels to be reduced more than luminance values of the second set of pixels.

20. The method of claim 16, wherein the luminance range associated with the pixels corresponds to a luminance range for a high dynamic range image.

* * * * *